United States Patent [19]
Ayoub et al.

[11] Patent Number: 5,710,924
[45] Date of Patent: Jan. 20, 1998

[54] METHOD OF ROUTING MESSAGES WITHIN A MULTI-PROCESSING SOFTWARE SYSTEM

[75] Inventors: Ramy P. Ayoub, Arlington Heights; Arthur L. Fumarolo, Schaumburg; John William Maher, Woodstock, all of Ill.

[73] Assignee: Motorola, Inc., Schaumburg, Ill.

[21] Appl. No.: 427,025

[22] Filed: Apr. 24, 1995

[51] Int. Cl.$^6$ .................................. G06F 9/00; G06F 9/44
[52] U.S. Cl. .................. 395/683; 395/685; 395/200.31; 395/200.36
[58] Field of Search ................ 395/700, 200.03, 395/650, 683, 685, 200.31, 200.36

[56] References Cited

U.S. PATENT DOCUMENTS

| | | | |
|---|---|---|---|
| 4,926,495 | 5/1990 | Comroe et al. | 455/54 |
| 4,961,070 | 10/1990 | Maher et al. | 340/721 |
| 5,341,478 | 8/1994 | Travis, Jr. et al. | 395/200.03 |
| 5,481,718 | 1/1996 | Ryu et al. | 395/700 |
| 5,566,337 | 10/1996 | Szymanski et al. | 395/733 |

*Primary Examiner*—Jack B. Harvey
*Assistant Examiner*—Jeffrey K. Seto
*Attorney, Agent, or Firm*—Andrew S. Fuller

[57] ABSTRACT

A multi-processing software system (200) has multiple operating processes (221, 222, 223, 224, 225, 226, 227, 228) that communicate with each other using messages. Each process has a corresponding process class (410, 411, 412, 413). Each message is assigned a message type (450, 451, 452, 453), and messages types are mapped (400) to least one process class. A particular message is routed to processes having a process class corresponding to the one or more process classes mapped to the message type of the particular message.

12 Claims, 6 Drawing Sheets

METHOD OF ROUTING MESSAGES WITHIN A MULTI-PROCESSING SOFTWARE SYSTEM

CROSS REFERENCE TO RELATED APPLICATIONS

This application is related to pending U.S. patent applications, Ser. No. 08/427,516 filed concurrently herewith, entitled METHOD OF PROVIDING DISTRIBUTED OPERATIONAL CONTROL OF A RADIO COMMUNICATION SYSTEM, and application Ser. No. 08/772,238, which is a continuation of application Ser. No. 08/427,513 entitled METHOD OF MANAGING TERMINATION OF A MULTI-TASKED SOFTWARE APPLICATION and assigned to Motorola, Inc.

TECHNICAL FIELD

This invention relates in general to the operation of a software application in a multi-processing environment, and more particularly, to the routing of messages within a multi-processing software application.

BACKGROUND OF THE INVENTION

Many software applications operate in a multi-processing environment and comprise several executable processes (herein, "client processes"). The client processes communicate with each other and otherwise interact to perform requisite functions. In a typical environment, interprocess communication is accomplished with the use of a messaging system in which a process sends a message to another process identified by a specific address. The address may include the name and location of the other process. In one prior art approach, a process communicates directly with another process by invoking a messaging system function call, with a specific address as an input parameter. In another approach, messages are tagged with a particular designation and sent to a message router which forwards the message to the particular designation.

For many applications, it is desirable to have a group of core processes concurrently operating as components of a multi-processing application, with the capability of interfacing with external processes. A message directed at the multi-processing software application may be ultimately processed by only one of the core processes comprising the application. The external process could communicate with the multi-processing application by sending the message directly to this process. However, it may be desirable not to have the internal communication structure of the multi-processing application made available to external processes. Further, it may be desirable to provide isolation for external processes, from changes to the internal organization of the core processes. Such isolation is useful to support third-party add on features. Prior art messaging systems do not provide adequate support for external access to internal core processes of a software application, while permitting reorganization of functional divisions within the core processes without adversely affecting the external process interface. Moreover, it is preferable to provide such messaging support for external as well as internal processes.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

The present invention provides for the routing of messages within a multi-process software application operating on a computer system. In the preferred embodiment, the multi-process software application provides support for operator assisted operational control of a radio communication system. When the multi-process software application is invoked, several executable client processes are ordinarily activated. According to the present invention, the processes of the multi-process software application are classified into predetermined process classes. Messages to be transferred within the multi-process software application are each assigned a message type. Each message type is mapped to at least one process class. This mapping of message types, process classes, and client processes is accessible to a message router. When messages are sent within the multi-process software application, the message router extracts the message type, and uses this message type to find corresponding process classes. The message router then routes the message to each client process that has a corresponding process class. Using this mapping structure, a particular message may be broadcast to all the client processes, to some of the client processes, or to one client process, depending on the mapping structure. This provides significant flexibility in the configuration of the recipient of a message sent within the system. The ultimate designation of message sent by a process is not determined directly within the process and thus flexibility is maintained. Whenever a process receives a message, the process may proceed to act on the message without having to filter out messages that were not destined for that process. Moreover, if an external interface is provided that supports messages received from external processes, reorganization of the core processes that handle each external message can be accomplished without impact to the external processes.

Figure 1:
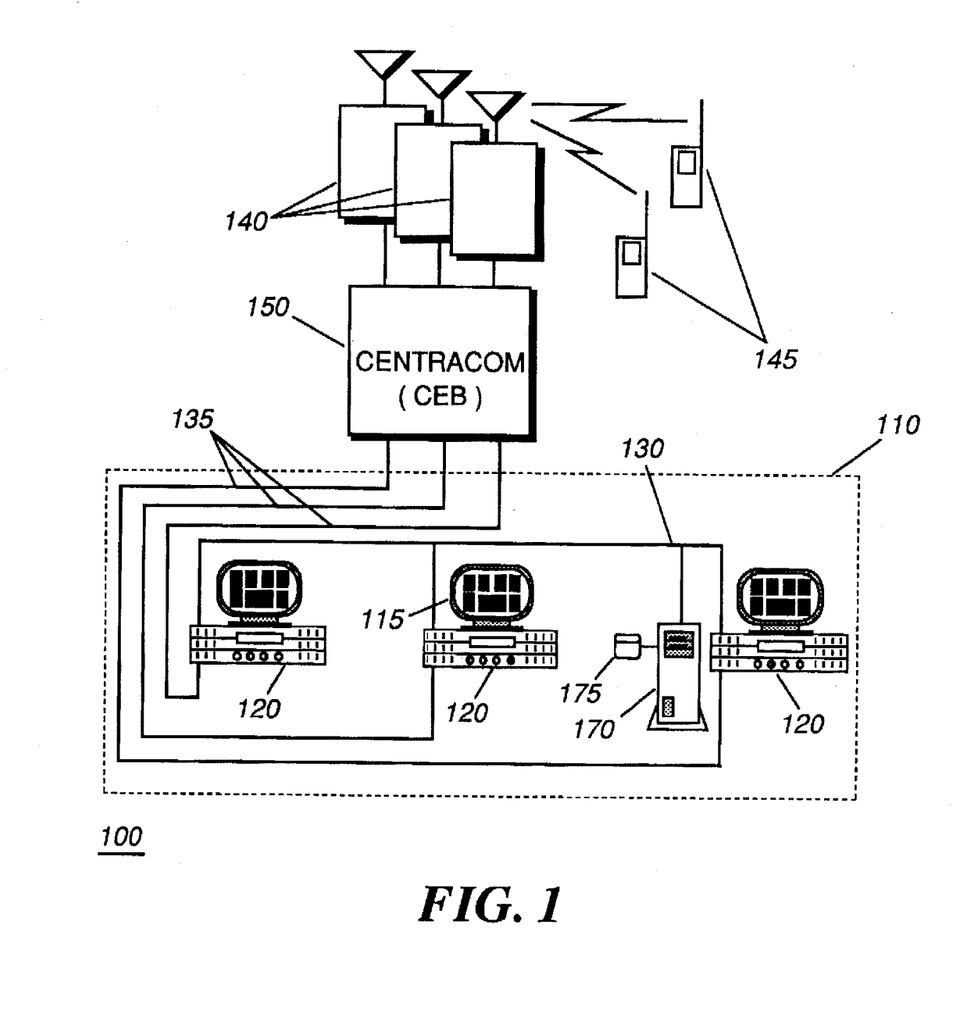
FIG. 1 shows a radio communication system with an operational control interface, in accordance with the present invention.

Referring to FIG. 1, a block diagram of a radio communication system 100 is shown, in accordance with the present invention. The communication system 100 includes wireless transceivers 140, or base stations, which are linked through a communication system interface 150 and connected to a communication network 130, and a computer system 110. The transceivers 140 interface with remotely situated wireless communication devices 145, such as portable or mobile two-way radios. The communication system interface 150 is a CENTRACOM Central Electronics Bank (CEB), available from Motorola, Inc. The communication system interface 150 interconnects the wireless transceivers 140 to the computer system 110 through a serial link interface 135, also referred to herein as a hardware link.

The computer system 110 supports operational control of the radio communication system 100, or a portion thereof. The computer system 110 has multiple console workstations 120, each providing an operator interface to the radio communication system. The computer system also includes a database server 170, accessible by each console workstation, that provides centralized access to a resource configuration database 175 for the radio communication system (herein "radio communication database"). Software processes running on the console workstations interface with the database server to access the radio communication database 175. In the preferred embodiment, the console workstations 120 are personal computer (PC) class computing devices, utilizing a multi-tasking operating system, such as the Microsoft® Windows NT operating system, and connected via a local area network. However, the present invention is not limited to a specific computing device, operating system, or computer network.

Each console workstation 120 has output devices, such as display unit 115, and input devices (not shown) to support an operator control interface to the radio communication system 100. An operator interacts with the operator control interface via the display unit 115, and via one or more input devices, such as a keyboard, and a mouse or other pointing device.

Figure 2:
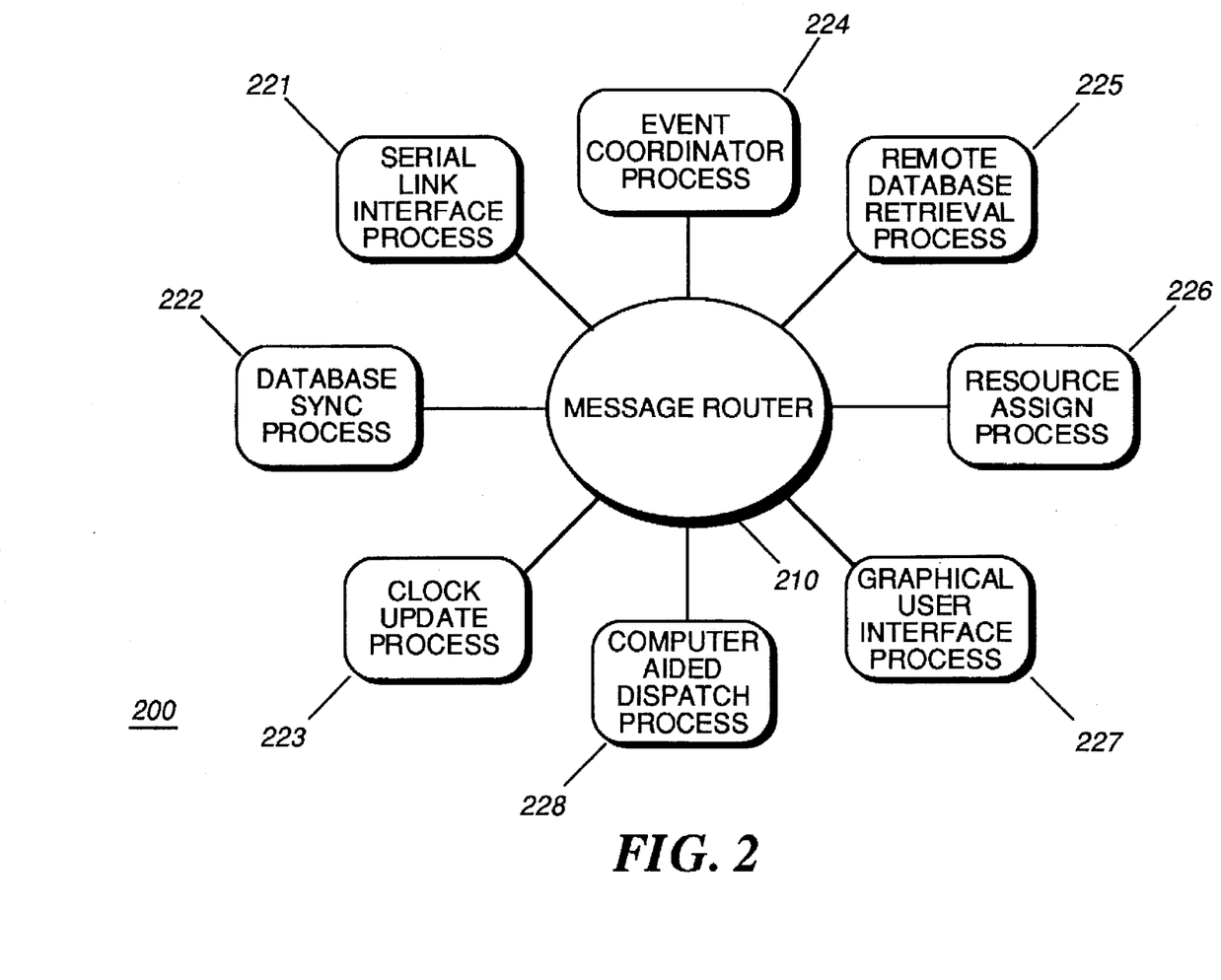
FIG. 2 is a block diagram of a multi-processing radio console software system, in accordance with the present invention.

FIG. 2 is a high level block diagram of the software architecture of a multi-process console software system 200, as executed on the console workstation 120, in accordance with the present invention. Referring to FIGS. 1 and 2, the operator control interface 200 comprises processes 210, 221-228 that execute on the console workstation as part of a multi-process software system or application (hereinafter "console software system") supporting operator assisted operational control of the radio communication system. Selected client processes 210, 221-228 of the console software system communicate with each other, and some of these processes perform functions essential or important to the overall operation the console software system.

The console software system includes, among other processes, a message router 210, a serial link interface process 221, a database synchronization process 222, a clock update process 223, an event coordinator process 224, a remote database retrieval process 225, a resource assign process 226, a graphical user interface (GUI) process 227, and a computer aided dispatch process 228. The message router process 210 serves as a communication server for other processes 221-228 of the console application. The message router 210 is responsible for correctly routing a particular message to all processes that require the particular message. The processes 221-228 connect to the message router 210 via message queues in a manner well known in the art. The serial link interface process 221 retrieves and sends information between a console workstation and the communication system interface 150. The remote database retrieval process 225 retrieves system configuration information from the database server 170. The database synchronization process 222 synchronizes information in a local database on the console workstation 120 with information stored within the communication system interface 150. The event coordinator process 224 coordinates the remote database retrieval process 225 with the database synchronization process 222. The event coordinator process 224 also gathers fault maintenance information from the other client processes in the system, and determines whether the console operator may dispatch, based on this fault maintenance information. If the event coordinator 224 determines that dispatching by the operator should not proceed, then the operator will be notified of this condition. The clock process 223 is responsible for monitoring the clock information coming from the communication system interface 150, and updating the console workstation 120 clock accordingly, thereby synchronizing the time on the various console workstations 120. The graphical user interface process 227 provides the operator interface to the system. The computer aided dispatch process 228 provides an interface which allows external control of the console system.

When the console software system is initiated, each process 221-228 registers with the message router 210, as a member of a pre-determined process class. As a particular process registers, it is assigned a unique process identifier (PID) by the message router 210. One or more of the client processes described above may belong to the same process class. In the preferred embodiment, process classes are assigned by the developers of the process based on the type of information required by the process to perform its function, or based on the function performed. For example, processes providing user interface functions, such as the GUI process 227, are assigned to the Dispatch User Interface (DUI) class. Members of the same class may, or may not, perform the same type of function.

Figure 3:
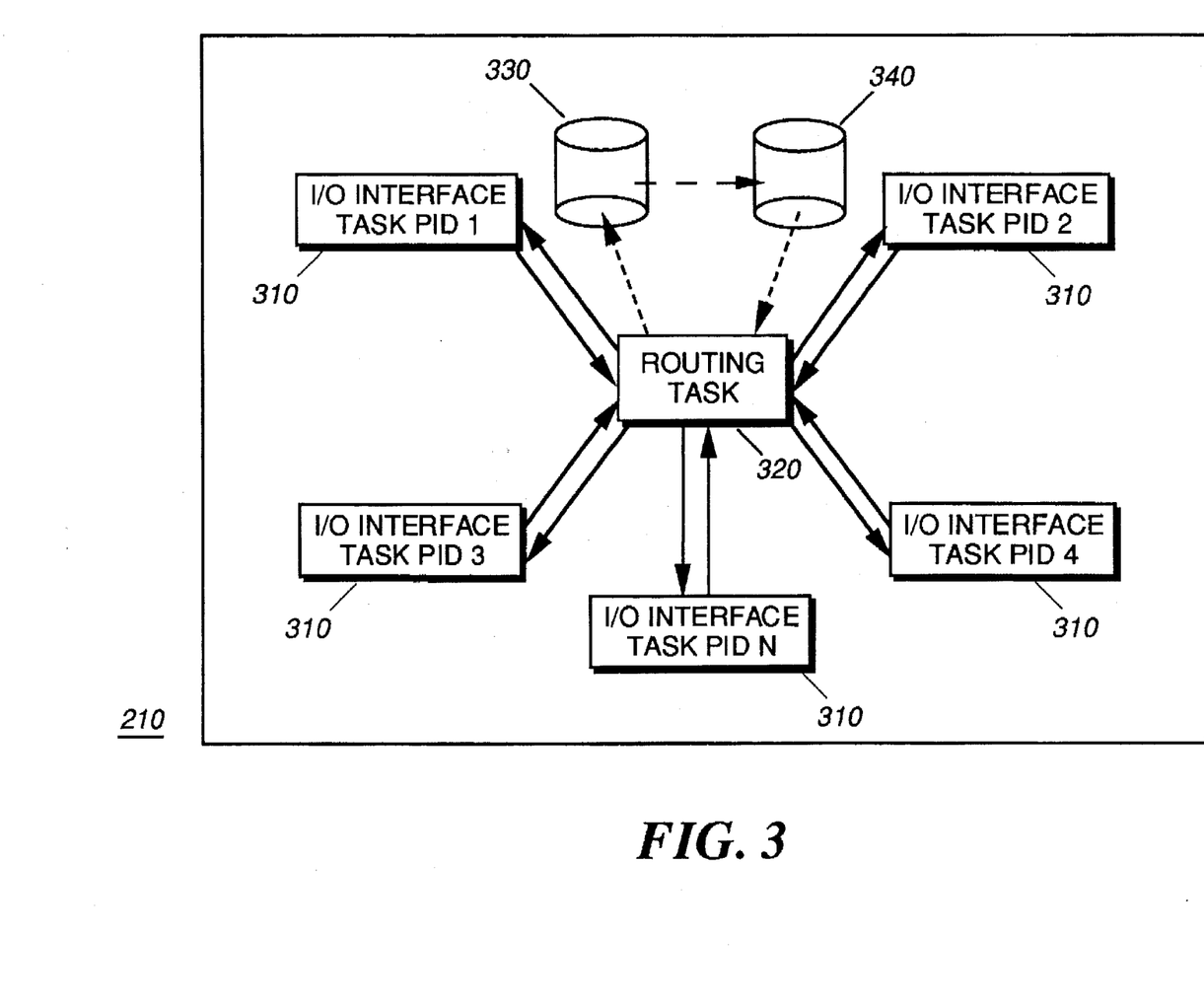
FIG. 3 is a block diagram of the message router, in accordance with the present invention.

Each process has a particular function and may operate on messages received via a message queue to perform its function. When a process needs to communicate with another process, the process sends a message to the message router 210 which message preferably includes a particular message type. Further discussion of the internal operations of the client processes are not necessary for the understanding of the present invention. However, the architecture and function of the message router 210 is a significant aspect of the present invention. FIG. 3 is a block diagram describing the internal software architecture of the message router 210, in accordance with the present invention. The message router 210 includes an input/output (I/O) interface task for each client process comprising the console software system. A message received by the I/O interface task 310, corresponding to a particular process is forwarded to a routing task 320. The routing task 320 uses the message type embedded in each received message to identify process classes mapped to that message type by accessing a message type to process class database 330. Using the process class, or classes, mapped to the message type, the routing task 320 accesses a process class to process identifier database 340, to determine the list of processes which are to receive that message. The routing task 320 then routes the message to each process on the list.

Figure 4:
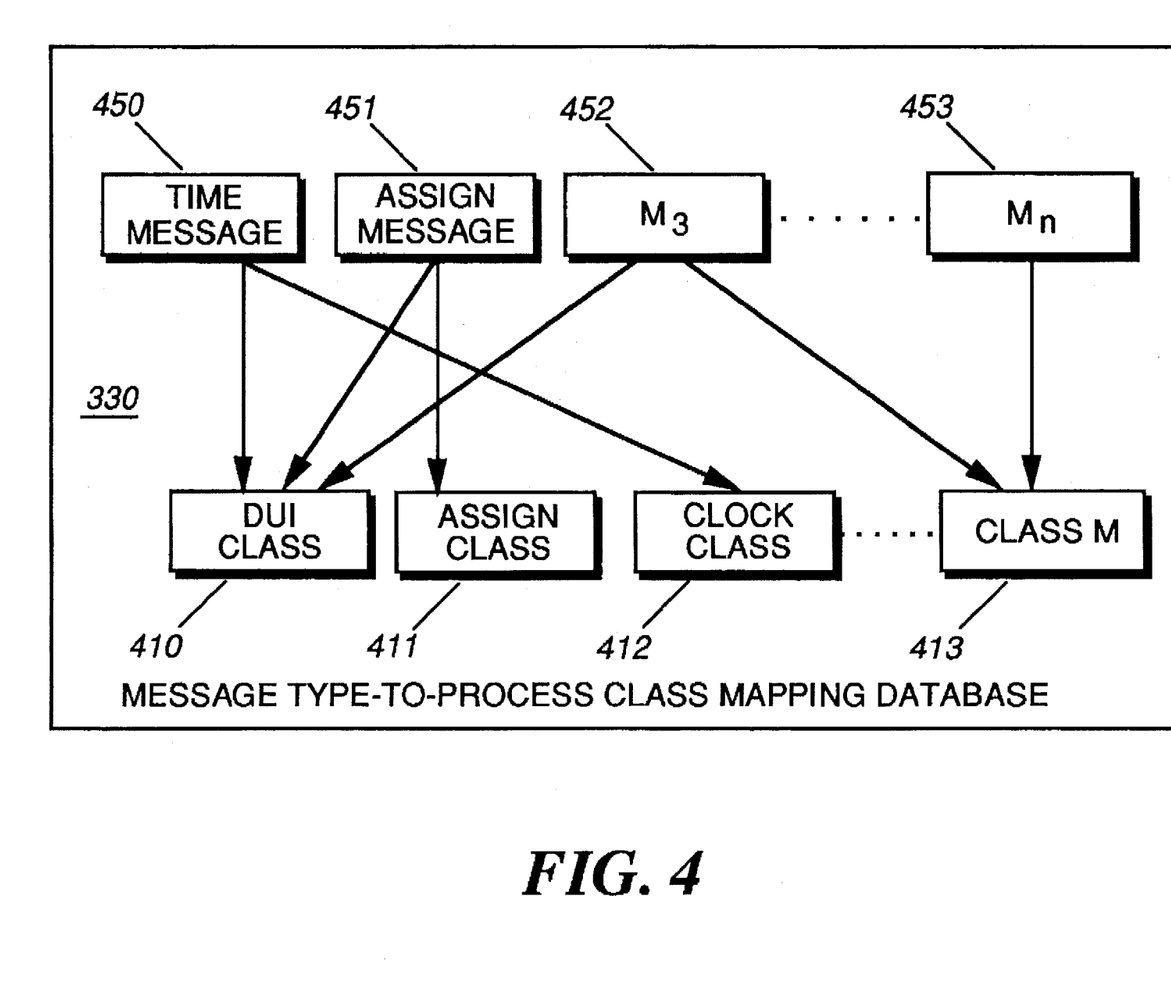
FIG. 4 is a block diagram of a database of a message type to process class mapping, in accordance with the present invention.

FIG. 4 is a block representation of the message type to process class database 330, in accordance with the present invention. The message type to process class mapping database is formed in a data storage location which is accessible to the message router, such as on the console workstation 120. As noted earlier, a process class comprises processes that operate on a particular message type. Each message type is mapped to at least one process class. For example, the DUI class 410 has all the processes that operate on a TIME message type 450, an ASSIGN message type 451, and an $M_3$ message type 452. A message type can be mapped to more than one process class. For instance, the TIME message type 450, is mapped to both the DUI class 410 and the CLOCK class 412. Similarly, the ASSIGN message type 451 is mapped to both the DUI class 410 and the ASSIGN class 411. An $M_n$ message type 453 is mapped only to the process class, CLASS M 413. Thus, the message type to process class mapping has a many-to-many relationship. For illustration purposes, when a message having a TIME message type 450 is received by the router task 320, the router task 320 retrieves two designation classes from the message type to process class database. In this case, the two designation classes are the DUI class 410, and the CLOCK class 412.

Figure 5:
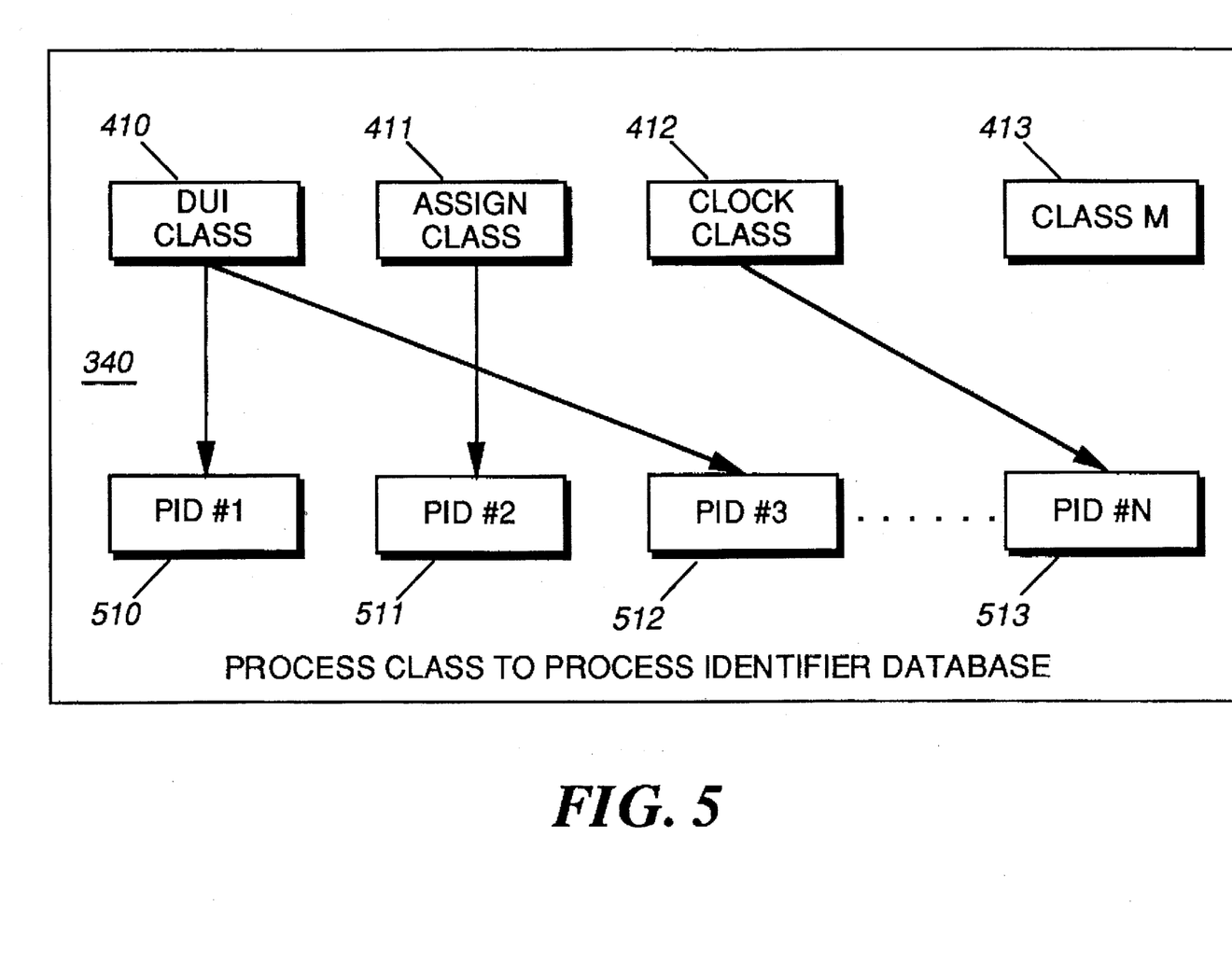
FIG. 5 is a block diagram of a database of a process class to client process mapping, in accordance with the present invention.

FIG. 5, is a block diagram of the internal architecture of the process class to process identifier database 340. This database 340 associates client process identifiers with each process class and is also formed in a data storage location accessible to the message router, such as on the console workstation 120. Only a representative set of the process classes and the process identifiers are shown: DUI class 410, ASSIGN class 411, CLOCK class 412, and CLASS M 413; and, PID#1 510, PID#2 511, PID#3 512, PID#4 513, respectively. Preferably, each process is assigned, i.e., is a member of, only one process class. However, a process class may have several processes as members. For example, the DUI process class 410 has two processes registered as members, which are identified as PID#1 510, and PID#3 512. In another example, the ASSIGN class 411 has PID#2 511 registered as a member. The process identifiers, i.e., PID #1 through PID#N, correspond to the processes identified as components of the console software system, such as the graphical user interface process 227, the computer aided dispatch process 228, and the like. The process identifier is dynamic and is updated by the message router as client processes register with and de-register from the system.

Figure 6:
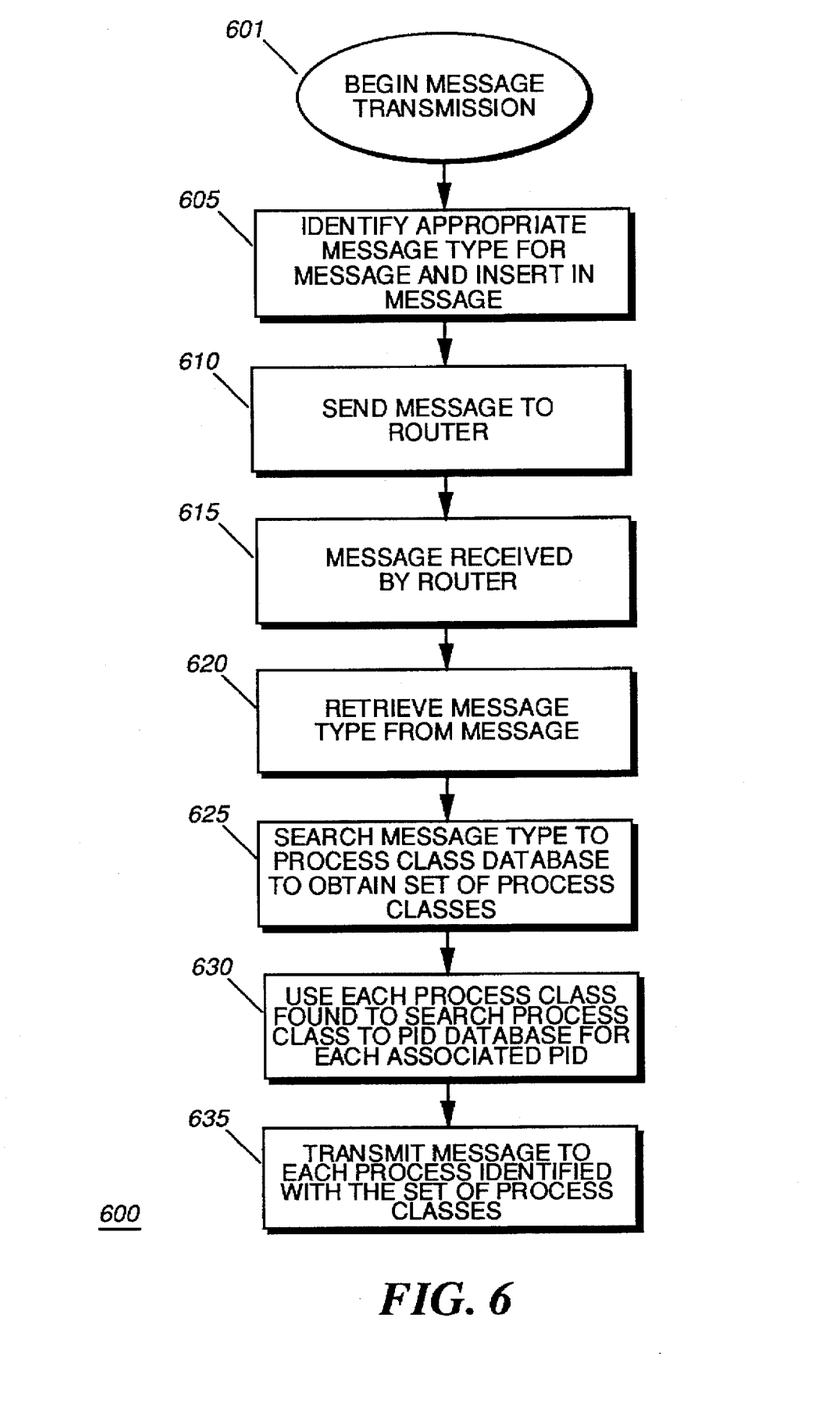
FIG. 6 is a flow chart of procedures to effect message routing, in accordance with the present invention.

FIG. 6 is a flowchart of procedures 600 used in routing messages within the multi-process software application, in accordance with the present invention. Referring to FIGS. 2–6, one of the client processes, such as the graphical user interface process 227, originates the transmission of a particular message to the message router 210 for distribution to other processes, step 601. A message type is associated with the particular message and inserted into the header for the particular message, step 605. The particular message is then sent, via a message queue or other interface, to the message router 210, step 610. The particular message is received by the router via a corresponding I/O task 310, step 615. The router retrieves the message type from the particular message, step 620, and then attempts to map the message type to at least one process class.

The message type to process class database 330 is searched to retrieve identification information for at least one process class that corresponds to the message type, step 625. The database 330 is searched using the message type of the particular message to obtain a set of process classes. The set of process classes is used to obtain a set of client process identifiers. Each process class of the set is used to search the process class to process identification database 340, to identify the processes associated with the particular process class step 630. The process identifiers corresponding to the particular process class, is retrieved and the particular message forwarded or sent to each corresponding process, step 635. Note that for the process classes mapped to the particular message type, the corresponding process identifiers are retrieved in turn from the process class to process identifier database, and the message forwarded to the identified processes. Accordingly, the particular message is routed or transferred to each client process that has a process class corresponding to the process classes that are mapped to the message type.

The present invention offers significant advantages over the prior art. The combination of assigning message types to messages, mapping message types to process classes, and the assignment of each process instance identifier to a process class, offers much flexibility in the distribution of messages. Databases maintained with the respective mappings and assignments are used to quickly determine routing decisions. This organization allows the hiding of the internal communication structure among core client processes of a multi-process software system while providing for the accommodation of support for external processes. Reorganization of the core processes to service the various message types may occur without adversely affecting the stability of a communication interface with external processes.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a multi-process software system having a plurality of client processes, each client process having a corresponding process class, a method of routing a message among at least some of the plurality of client processes, the method comprising the steps of:

assigning a message type to the message;

mapping the message type to at least one process class; and routing the message to each of the plurality of client processes having a process class that corresponds to the at least one process class.

2. The method of claim 1, wherein the step of mapping comprises the step of mapping the message type to a plurality of process classes.

3. The method of claim 2, wherein the step of routing comprises the steps of:

transmitting the message to a message router;

retrieving, by the message router, an identification for at least one process class corresponding to the message type of the message;

identifying, by the message router, at least one client process based on membership in the at least one process class; and forwarding, by the message router, the message to the at least one client process.

4. In a multi-process software system having a plurality of client processes and a message router for transferring a particular message among the plurality of client processes, a method comprising the steps of:

assigning a process class to each of the plurality of client processes;

assigning a message type to the particular message;

mapping the message type to at least one process class;

transferring the message to the message router; and routing, by the message router, the particular message to each of the plurality of client processes that has a process class mapped to the message type.

5. The method of claim 4, further comprising the step of:

a first database of message type to process class mapping in a data storage location accessible to the message router.

6. The method of claim 5, further comprising the step of:

forming a second database having client process identifiers associated with each process class in a data storage location accessible to the message router.

7. The method of claim 6, wherein the step of routing comprises the step of:

searching the first database using the message type of the particular message to obtain a set of process classes;

searching the second database using the set of process classes to obtain a set of client process identifiers; and transmitting the particular message to each client process identified by the set of client process identifiers.

8. A method of routing messages using a message router, comprising the step of:

registering a first client process as a member of a predetermined process class in a process class to client process database;

sending, by a second client process, a message to the message router, the message having an associated message type;

at the message router:

accessing a message types to process class database to determine a set of process classes associated with the message type;

accessing the process class to client process database using the set of process classes to identify client processes associated with the set of process classes; and distributing the message to each client process identified, including the first client process.

9. The method of claim 8, wherein each client process is associated with only one process class in the process class to client process database, and at least one of the message types have a plurality of process classes associated therewith in the message types to process class database.

10. A message routing system, comprising:

a first database having a message type to process class mapping;

a second database having a process class to client processes mapping; and a message router responsive to a received message with an associated message type to determine corresponding client processes from a combination of the first and second databases using the message type.

11. The method of claim 10, wherein each client process is associated with only one process class in the second database, and at least one of the message types has a plurality of process classes associated therewith in the first database.

12. The method of claim 11, further comprising a plurality of client processes that register and de-register process class membership information with the message router.

* * * * *

UNITED STATES PATENT AND TRADEMARK OFFICE
CERTIFICATE OF CORRECTION

PATENT NO. : 5,710,924
DATED : January 20, 1998
INVENTOR(S) : Ayoub, et al.

It is certified that error appears in the above-identified patent and that said Letters Patent is hereby corrected as shown below:

Column 6, line 59, before "a first database" insert -- forming--.

Signed and Sealed this

Twenty-eighth Day of July, 1998

Attest:

BRUCE LEHMAN

*Attesting Officer*          *Commissioner of Patents and Trademarks*